(12) United States Patent
Guth et al.

(10) Patent No.: US 6,587,810 B1
(45) Date of Patent: Jul. 1, 2003

(54) COORDINATE MEASUREMENT DEVICE AND METHOD FOR CONTROLLING SAME

(75) Inventors: Thomas Guth, Böbingen (DE); Bernd Czepan, Heidenheim (DE)

(73) Assignee: Carl-Zeiss-Stiftung, Oberkochen (DE)

( * ) Notice: Subject to any disclaimer, the term of this patent is extended or adjusted under 35 U.S.C. 154(b) by 0 days.

(21) Appl. No.: 09/700,201
(22) PCT Filed: Apr. 29, 1999
(86) PCT No.: PCT/EP99/02909
§ 371 (c)(1),
(2), (4) Date: Nov. 13, 2000
(87) PCT Pub. No.: WO99/59038
PCT Pub. Date: Nov. 18, 1999

(30) Foreign Application Priority Data

May 13, 1998 (DE) .......................................... 198 21 372

(51) Int. Cl.⁷ .............................................. G01B 11/24
(52) U.S. Cl. ......................................... 702/168; 33/503
(58) Field of Search ............................ 702/94, 95, 150, 702/152, 168; 33/503, 556

(56) References Cited

U.S. PATENT DOCUMENTS

| 5,434,803 A | 7/1995 | Yoshida |
| 5,471,406 A | * 11/1995 | Breyer et al. ............... 702/168 |
| 5,491,638 A | 2/1996 | Georgi et al. |
| 5,895,442 A | * 4/1999 | Arndt ......................... 702/85 |

FOREIGN PATENT DOCUMENTS

| DE | 3234241 | 3/1983 | |
| DE | 4006949 | 9/1991 | |
| DE | 4326988 A1 | * 2/1995 | ......... G05B/19/402 |
| DE | 4336863 | 5/1995 | |
| EP | 0 569 694 | 11/1993 | |
| EP | 0 769 677 | 4/1997 | |

\* cited by examiner

Primary Examiner—John Barlow
Assistant Examiner—Anthony T. Dougherty
(74) Attorney, Agent, or Firm—Walter Ottesen

(57) ABSTRACT

The invention relates to a coordinate measurement device comprising a stylus (11) which can be displaced in the coordinate directions (x, y, z) for sampling a workpiece (12), a mechanism (10) with drive units by means of which the stylus can be moved and a control unit (15, 16) for controlling the mechanism. To define the points (pk2) to be sampled on the workpiece, parameters of geometric elements (k1, k2, e1, e2) and parameters of the points (pk1, pk2, pe1, pe2) to be sampled on the corresponding geometric elements are memorized. To be able to modify the measurement sequence of such a coordinate measurement device more easily, the invention provides for the parameters of the points (pk2) to be sampled on a particular geometric element to be memorized separately in relation to a coordinate system (xk2, yk2, zk2) which is specific to the corresponding geornetric element (k2).

14 Claims, 4 Drawing Sheets

COORDINATE MEASUREMENT DEVICE AND METHOD FOR CONTROLLING SAME

FIELD OF THE INVENTION

The invention relates to a coordinate measuring apparatus having a probe movable in the coordinate directions for scanning a workpiece. The coordinate measuring apparatus also includes a mechanism with drives via which the probe is moved as well as a control apparatus for controlling the mechanism.

BACKGROUND OF THE INVENTION

Coordinate measuring apparatus of this kind have long been known and are offered in various configurations. For example, a coordinate measuring apparatus can be of the so-called portal type having a portal mechanism wherein a portal spans a measuring table. The portal is movably guided on the measuring table in a first coordinate direction and can be moved via corresponding drives, such as friction wheel drives or spindle drives. A so-called transverse sled is mounted in the spanning part of the portal and can likewise be moved by drives in a second coordinate direction along the spanning part of the portal. On the transverse sled, in turn, a vertically aligned measuring arm is guided in the third coordinate direction. A probe is disposed at the lower end of the measuring arm and, with the probe, a workpiece to be measured can be scanned. The probes can be contacting probes which mechanically touch the workpiece and wherein the contact touching is detected via a deflection of the probe or, for example, the probes can be optical probes with which the surface of the workpiece to be measured is optically scanned.

Another relatively widely distributed configuration of coordinate measuring apparatus is the so-called stand measuring apparatus having a stand mechanism wherein a vertically aligned column is movably guided along a measuring table and which can be displaced via drives. A so-called cross slide is movably guided on the column in the vertical direction. On the cross slide, a horizontally guided measuring arm is movably guided and the probe is disposed on the end of the this measuring arm. This coordinate measuring apparatus is likewise driven by corresponding drives.

Control units are usually provided for controlling such coordinate measuring apparatus. The control units comprise, for example, an input computer and an evaluation computer and a separate control arrangement wherein the hardware functions for controlling the mechanics of the coordinate measuring apparatus are realized. The traveling paths and the evaluation requirements are usually defined in the computer. The travel paths are especially driven along for scanning the workpiece. For specifically defining the traveling paths, so-called geometric elements are defined based on which the geometry of the workpiece to be measured is simulated.

The geometric elements define the smallest possible definable geometric units based upon which the geometry, which is actually to be scanned, of the workpiece to be measured is simulated. On the basis of this geometry, the actual points, which are to be scanned on the surface of the workpiece, are defined. A usual compilation of such geometric elements are: the point, the circle, the cylinder, the cone, the sphere, the ellipse, the plane, the straight line, the torus, and the paraboloid as well as the curve and the free-form surface.

The points, which are to be scanned on the workpiece surface, are defined with this compilation of geometric elements in coordinate measuring apparatus.

In coordinate measuring apparatus known up to now, the geometric element as well as the points, which are to be scanned on the geometric elements, were always referred to a common reference coordinate system, for example, the machine coordinate system of the coordinate measuring apparatus or the workpiece coordinate system of the workpiece to be measured. Such a reference to a common coordinate system is absolutely necessary during the execution of the measuring sequence because, otherwise, the probe could not be correspondingly moved.

The storage of the points to be scanned relative to the reference coordinate system had, however, the peculiarity that each time there was a change of the geometry of the workpiece and therefore also of the geometric elements, the points, which were to be scanned hereon, had to be completely newly defined. However, often small changes on the geometry of the workpiece to be measured are undertaken in different product stages or in components of a family of products. For this reason, this leads to a high complexity with respect to programming and this is especially so when the points to be scanned on the particular geometric element must be manually inputted with tedious programming work.

SUMMARY OF THE INVENTION

It is an object of the invention to provide a coordinate measuring apparatus proceeding from the above as well as a corresponding method for controlling such coordinate measuring apparatus with which the travel paths can be more easily changed.

The basic idea of the invention is that the parameters for defining the geometric elements and the points, which are to be scanned on the geometric elements, are stored referred to a coordinate system corresponding to the particular geometric element. In this way, the individual points of the geometric element to be scanned are in a fixed relationship to the geometric element coordinate system so that the desired geometry of the workpiece can easily be changed.

In order to clearly define the geometric element coordinate system, which is inherent to the geometric element, parameters (additionally assigned to each geometric element) are stored in the memory of the control unit as to offset of the geometric element coordinate system and/or parameters as to the orientation of the geometric element coordinate system with respect to a common reference coordinate system. In this way, each geometric element as such, referred to a common reference coordinate system, receives a clear offset and direction. In this way, a once defined geometric element can, together with the points to be scanned, be positioned and rotated without difficulty at various locations on the workpiece without having to newly input the geometric element and the points to be scanned. With a position change of the geometric element of this kind, only the parameters of the offset of the geometric element coordinate system and/or the orientation with respect to the common reference coordinate system are changed.

A special problem results additionally for some geometric elements when the dimension of the geometric element is changed because, for a corresponding change of the dimensions, the points, which are to be scanned, possibly no longer lie on the surface or the line of the geometric element. For example, if the diameter of a circle is changed, then the points, which are to be scanned, no longer lie on the circular line after the change without corresponding measures.

According to an especially advantageous embodiment of the method of the invention, and for a change of the dimensions of a geometric element, the parameters with respect to the points, which are to be scanned on the geometric element, are changed in such a manner that the perpendicular spacing of each point, which is to be scanned, from the geometric element, remains constant.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
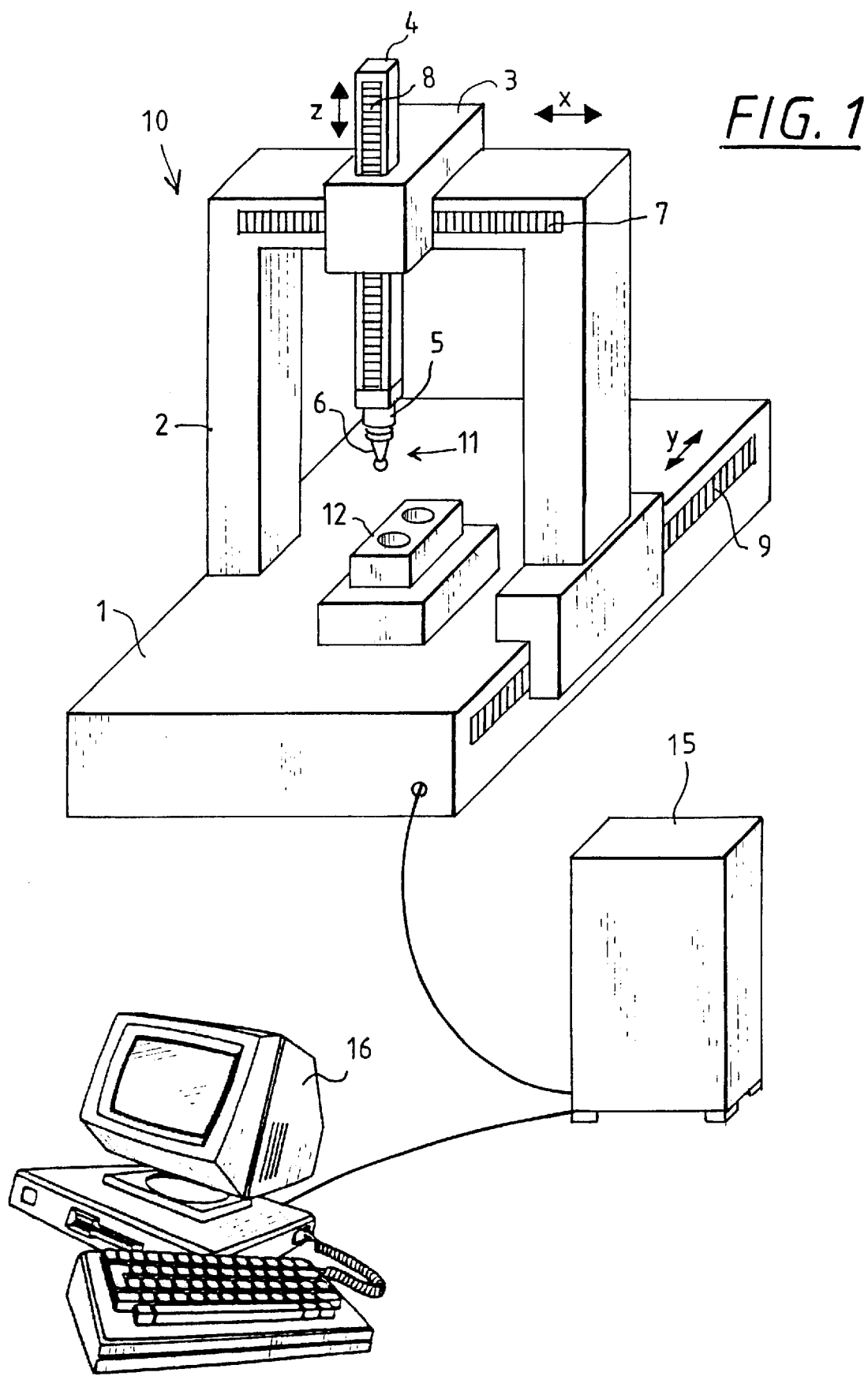
FIG. 1 is a schematic illustration of a coordinate measuring apparatus of the invention.

FIG. 1 shows a coordinate measuring apparatus of the invention which is shown here simply exemplary in the form of a portal measuring apparatus having a portal mechanic 10 and a mechanically operating probe 11. The coordinate measuring apparatus includes a workpiece table 1 on which a portal 2 is movably journalled in the direction of the arrow Y. The portal 2 is here driven by a friction wheel drive by way of example and can detect its precise position in the direction of the arrow Y via the scanning of the scale 9. A transverse sled 3 is movably mounted in the direction of arrow X in the portion of the portal 2 extending over the measuring table 1. The transverse sled 3 can likewise be driven via corresponding drives and its precise position can be determined in the direction of arrow X via the scanning of the scale 7. The measuring arm 4 is, in turn, movably mounted on the transverse sled 3 in the direction of arrow Z. The measuring arm 4 can likewise be moved via corresponding drives and the precise position can be determined by reading off the scale 8. A probe 11 in the form of a probe head 5 is disposed at the lower end of the measuring arm. A probe pin 6 for scanning the workpiece 12 is attached to the probe head 5. As a control arrangement for controlling the coordinate measuring apparatus, a control 15 is provided which undertakes the hardware-related control functions and the pickup of measurement values of the coordinate apparatus as well as a computer 16. In the computer 16, the travel paths of the probe head 5 and/or of the probe pin 6 are established in the coordinate directions (X, Y, Z) and the measurement results obtained in the measurement sequence are evaluated.

The control of such a coordinate measuring apparatus is, for example, described in U.S. Pat. No. 5,471,406 incorporated herein by reference.

The computer 16, in turn, is a standard PC having at least one monitor, a CPU, a hard disk, a RAM, a keyboard, as well as an interface card via which the computer 16 communicates with the control 15. The configuration of such a computer as well as the operation thereof are known to those of ordinary skill working in this area so that a drawing of the individual components of the computer, which would any- way be without informational content, can be omitted. When, in the text which follows, individual functions are explained which take place in the computer 16, it should again be emphasized that the functions are realized via programs, which are, at first, disposed on the hard disk and are loaded into the RAM during the running time from where they then control the components of the computer 16. The data, which are taken up during the execution of the program or are processed (for example, the parameters of the geometric elements to be measured), are disposed likewise in the RAM during the use of the coordinate measuring apparatus and are, at the latest, stored on the hard disk in corresponding directories before switching off the computer 16.

Figure 2:
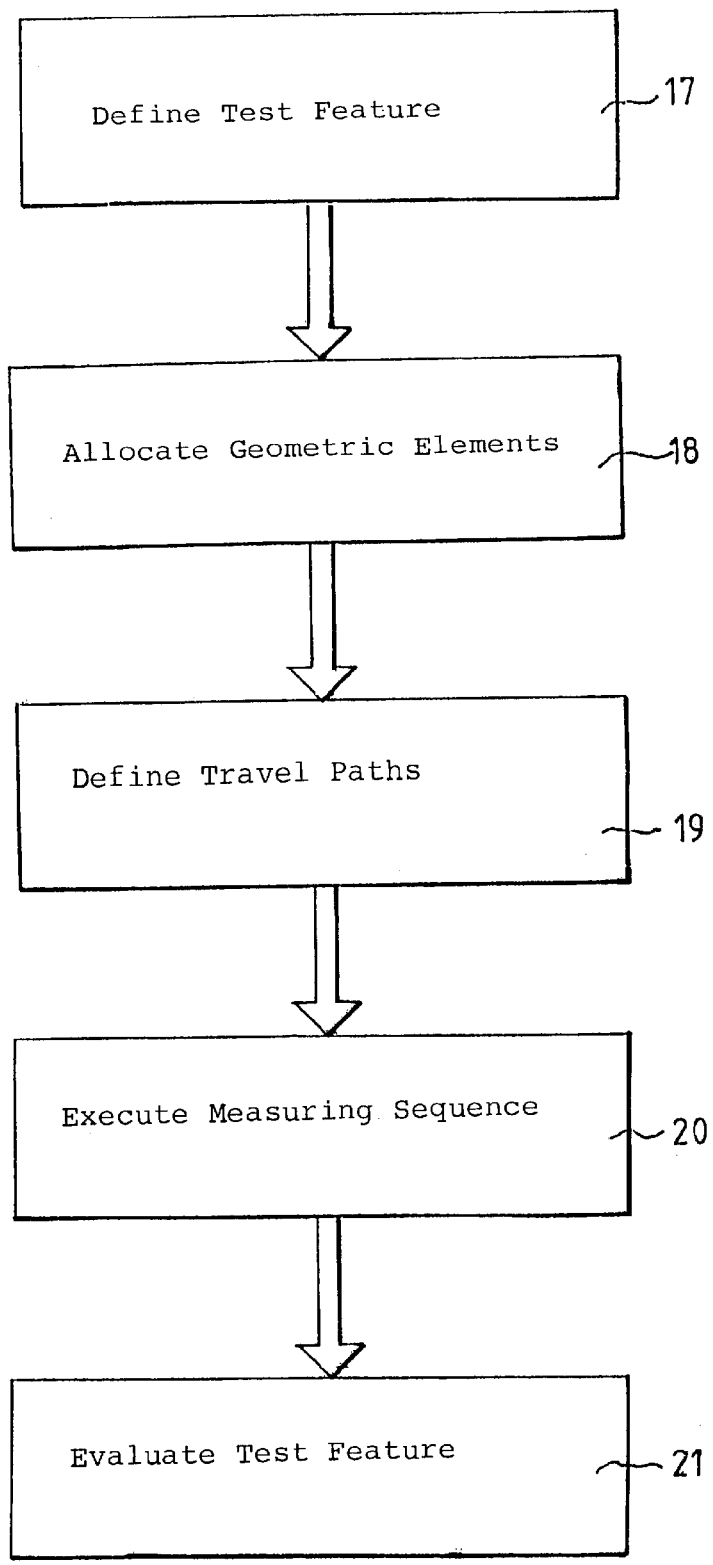
FIG. 2 is a schematic representation of a method for carrying out an automatic measuring sequence.

Establishing, executing and evaluating a measuring sequence will now be described with respect to FIG. 2. To input the travel paths, a test feature to be measured is first defined in step 17. This test feature is to be evaluated on the workpiece 12. The test feature can, for example, be a dimension of a geometric element or the desired deviation of the geometric element from its desired form, et cetera.

After a plurality of detailed parameters have been set, a geometric elements on the workpiece surface are assigned to the test feature. These geometric elements are to be scanned and are necessary, inter alia, in a step 18 for determining the test feature. After the corresponding geometric elements are selected or defined, the travel paths are defined in a next step 19. For this purpose, points which are to be scanned, are first determined on the particular geometric elements. This is realized in that either a corresponding macro automatically generates the points to be scanned with the corresponding normal vectors directed normally toward the workpiece surface or in that the points, which are to be scanned, are inputted manually with the corresponding normal vectors.

Furthermore, the travel paths for the probe to the different geometric elements, which are to be scanned, are determined. This can either likewise take place manually in that corresponding intermediate points are inputted or automatically with the program then taking care of generating the travel path.

The determined data are then transmitted to the control 15 of the coordinate measuring apparatus together with a plurality of parameters not explained here in greater detail in order to execute the measuring sequence in accordance with step 20. The control 15 defines the interface between the actual coordinate measuring apparatus and the computer 16 and realizes also the read-out and transmission of the measurement values, which are picked up in the measuring sequence, to the computer 16. This realization is in addition to the drive of the drives and the probe. As already described above, such a control is described in U.S. Pat. No. 5,471,406 and is exemplary. U.S. Pat. No. 5,471,406 is incorporated herein by reference.

The measurement data, which are obtained because of the measuring sequence, are evaluated in a last step 21 in the computer 16 in correspondence to the predefined test features.

The specific definition of the measuring sequence takes place based on computer 16 and is completely analog to international patent publication WO 99/58931. The complete disclosure of this patent is incorporated herein by reference.

It will now be explained in greater detail with respect to FIG. 3 how this is specifically done with an input of the geometric elements and the points, which are to be scanned, corresponding thereto. For this purpose, a specific measurement task is present as it is described, for example, in the above-mentioned international patent publication Wo 99/58931. As specific geometric elements, two circles (k1, k2) as well as two planes (e1, e2) of the workpiece 12 are to be defined with the workpiece 12 to be measured and being shown in FIG. 3. For this purpose, first the offset of the center point mkl of the circle k1 is inputted and is referred to the workpiece coordinate system (xw, yw, zw). This offset is defined in the form of a vector ($\vec{v}$ k1). The center point mkl of the circle serves the program simultaneously as a coordinate origin for the corresponding geometric element coordinate system (xk1, yk1, zk1) of the circle k1. In a next step, the orientation of the geometric element is determined. For this purpose, a normal vector nk1 is defined which is perpendicular to the circular surface of the circle k1 to be defined. The normal vector $\vec{n}$ k1 is simultaneously interpreted by the measurement program as z-axis zk1 of the geometric element coordinate system (xk1, yk1, zk1). Furthermore, a second vector $\vec{t}$ k1, which is perpendicular to the normal vector $\vec{n}$ k1 is defined and is orientated tangentially to the circular area of the circle k1 and represents the orientation of the x-axis xk1 of the geometric element coordinate system (xk1, yk1, zk1). This vector can be defined either by the operator or set automatically by computer 16 in accordance with a predefined algorithm. The direction of the third coordinate yk1 need not be explicitly defined because it results automatically from the two other coordinates (xk1, zk1) and thereby can be determined at any time by the computer 16. Furthermore, the radius rk1 of the circle k1 is given so that the line of the geometric element, which is to be scanned, is hereby defined. Thereafter, the individual points pk1, which are to be scanned, are, together with the normal vectors, either manually inputted or computed by a macro when this is wanted. The normal vectors are here not shown for the sake of clarity and point normally to the circle line.

The above data, that is, the offset of the geometric element coordinate system (xk1, yk1, zk1) in the form of vector $\vec{v}$ k1, the orientation of the geometric element coordinate system compared to the reference coordinate system (xw, yw, zw) in the form of the normal vector $\vec{n}$ k1 and of the tangential vector $\vec{t}$ k1, the radius rk1 of the circle k1 as well as the individual points pk1, which are to be scanned, with the normal vectors (not shown here) are stored in lists, which are correspondingly provided therefor, as list entries. One proceeds in the same manner also for the second circle k2.

One proceeds in a similar manner with respect to planes (e1, e2). Here too, the offset of the origin ae2 of the geometric element coordinate system (xe2, ye2, ze2) is defined by a vector $\vec{v}$ e2 which simultaneously lies on the plane. In the next step, two directional vectors ($\vec{l}$ e2, $\vec{m}$ e2) are fixed which are tangential to plane e2 and the plane is then spanned over these vectors. The first of these directional vectors $\vec{l}$ e2 is automatically selected by the program as a directional vector for the X axis xe2 of the relevant geometric element coordinate system. Although this would actually be superfluous, a normal vector $\vec{n}$ e2 is additionally entered which is normal to the plane e2 and simultaneously gives the direction ze2 of the relevant geometric element coordinate system (xe2, ye2, ze2). This normal vector $\vec{n}$ e2 and the first directional vector $\vec{l}$ e2 thereby provide the orientation of the geometric element coordinate system with respect to the reference coordinate system, that is, here the workpiece coordinate system (xw, yw, zw).

In a last step, the scan points pe2 with the corresponding normal vectors are defined. These normal vectors are normal to the workpiece surface (not shown). This can take place manually in that the corresponding data are inputted by the operator of the coordinate measuring system. The points, which are to be scanned, with the corresponding normal vectors can also be generated automatically via a macro. For the other plane e1, which cannot be seen in FIG. 3, one proceeds in the same manner.

The above data are stored likewise in lists in the memory of the computer 16 as a list entry. These lists are provided for the data, which include: the offset of the geometric element coordinate system (xe1, ye1, ze1; xe2, ye2, ze2) in the form of the vector ($\vec{v}$ e1, $\vec{v}$ e2), the orientation of the geometric element coordinate system relative to the reference coordinate system (xw, yw, zw) in the form of the normal vector ($\vec{n}$ e1, $\vec{n}$ e2) and the directional vectors ($\vec{l}$ e1, $\vec{m}$ e1; $\vec{l}$ e2, $\vec{m}$ e2), as well as the individual points (pe1; pe2), which are to be scanned, with normal vectors (not shown here).

After all geometric elements, which are needed for detecting the one test feature, have been inputted and stored, the individual geometric elements are tied into a total travel path as described above for travel path generation.

In a first operation, the points, which are to be scanned, are first converted to a common reference coordinate system, for example, the machine coordinate system or the workpiece coordinate system (xw, yw, zw) which however presents no problem after the offset and the orientation of the geometric element coordinate systems is known relative to the reference coordinate system (xw, yw, zw). The above points are referred to the individual geometric element coordinate systems (xk1, yk1, zk1; xk2, yk2, zk2; xe1, ye1, ze1, xe2, ye2, ze2). In the next step, between the individual geometric elements (k1, k2, e1, e2), the travel paths are either manually defined or automatically generated as described in U.S. Pat. No. 5,491,638 which is incorporated herein by reference.

After the travel path is completed, the measurement is carried out and the measurement results determined thereby are correspondingly evaluated.

As already mentioned herein initially, it often however happens that, for example, different components of a family of products differ slightly from each other and that therefore, for coordinate measuring apparatus known up to now, new geometric elements together with the points to be scanned herefor are to be newly defined for the changing geometries in order to carry out the changes. In contrast hereto, a change of this kind is very easily possible with the method of the invention as will be shown clearly with respect to FIG. 4.

Figure 3:
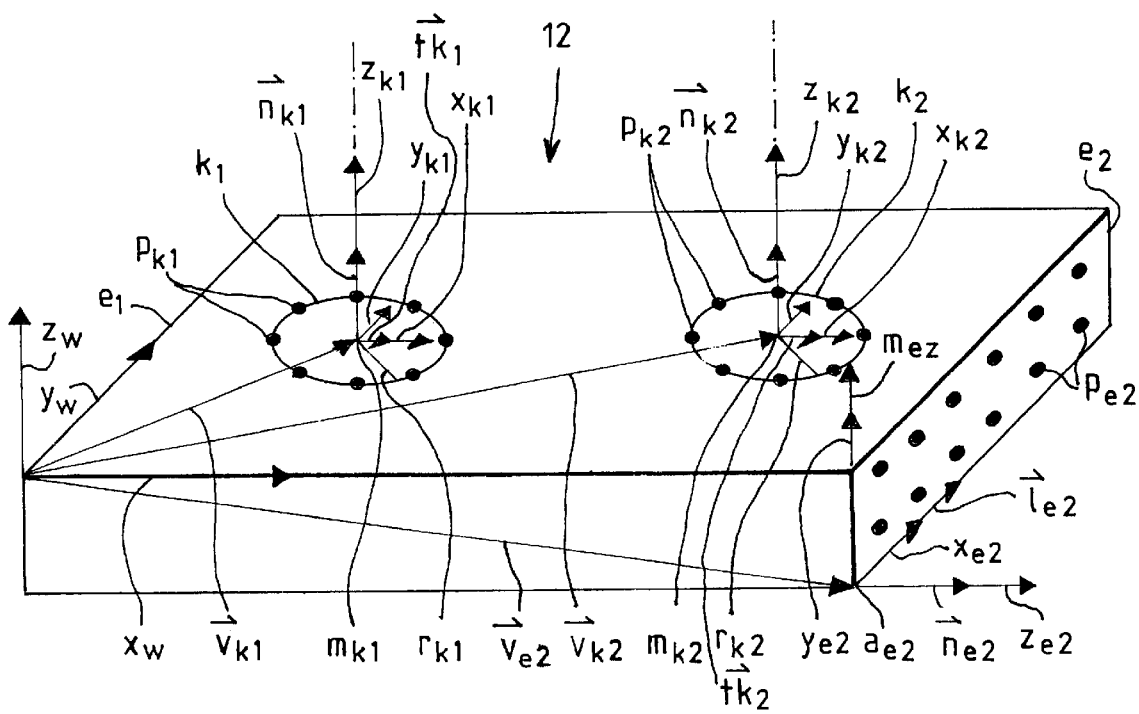
FIG. 3 shows a workpiece to be measured for which several geometric elements to be scanned are defined.
Figure 4:
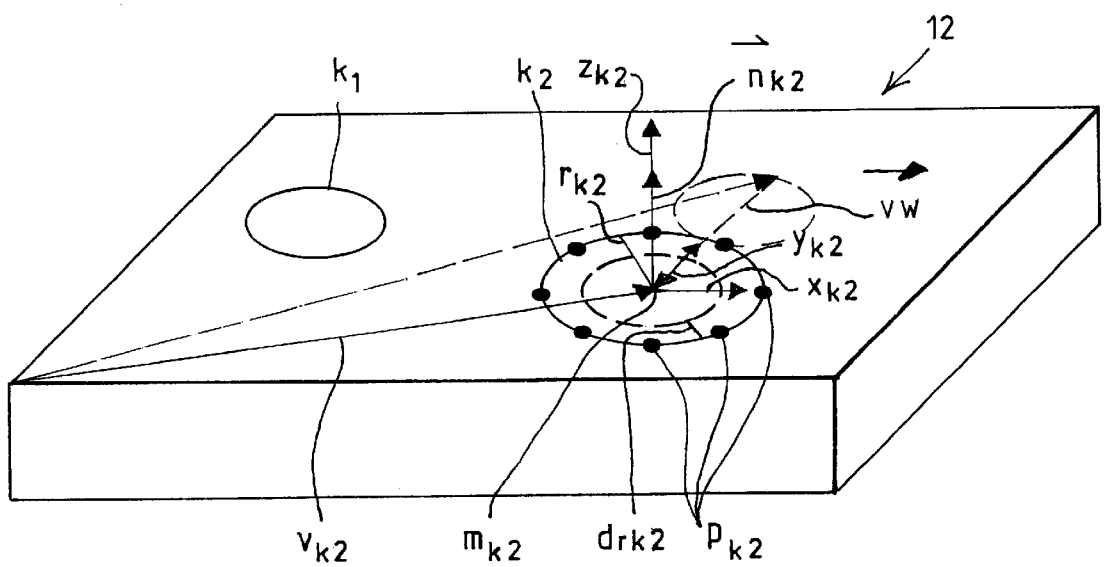
FIG. 4 shows the workpiece of FIG. 3 wherein the position and the size of a bore have been changed.

FIG. 4 shows a workpiece, which is slightly changed with respect to FIG. 3, wherein the location and the size of the bore b2 have been changed compared to the original workpiece 12. In order to be able to solve the above-identified measuring task, the center point mk2 of the geometric element "circle" k2 must be shifted by the vector $\vec{v}$ w and the radius rk2 of the circle k2 must be increased by the amount drk2 in a changed measuring sequence.

The particular geometric element, which is to be scanned, namely the circle k2, has been defined with its own geometric element coordinate system (xk2, yk2, zk2). For this reason, the change of the position of the geometric element and the points pk2 which are to be scanned hereon, can be very easily realized. For this purpose, the parameters with respect to the offset of the geometric element coordinate system (xk2, yk2, zk2) are changed relative to the reference coordinate system (xw, yw, zw), that is, the vector $\vec{v}k2$ is changed so that the new vector $\vec{v}k2$ is changed by the corresponding vector $\vec{v}w$. Since the points pk2, which are to be scanned, stand in a fixed spatial relationship to the geometric element coordinate system, these are automatically displaced hereby.

Furthermore, in the change according to FIG. 4, the parameter rk2, which determines the radius of the circle to be scanned, is increased by the amount drk2. For this, the following problem occurs.

Because of the change of the dimensions of the geometric element, the points pk2, which are to be scanned, are no longer located on the circular line of the circle k2 so that these points would have to be newly generated. This is especially then difficult when the points pk2 were not generated via a macro but were inputted manually. How this problem can be advantageously solved will now be explained with respect to FIGS. 5 and 6.

Figure 5:
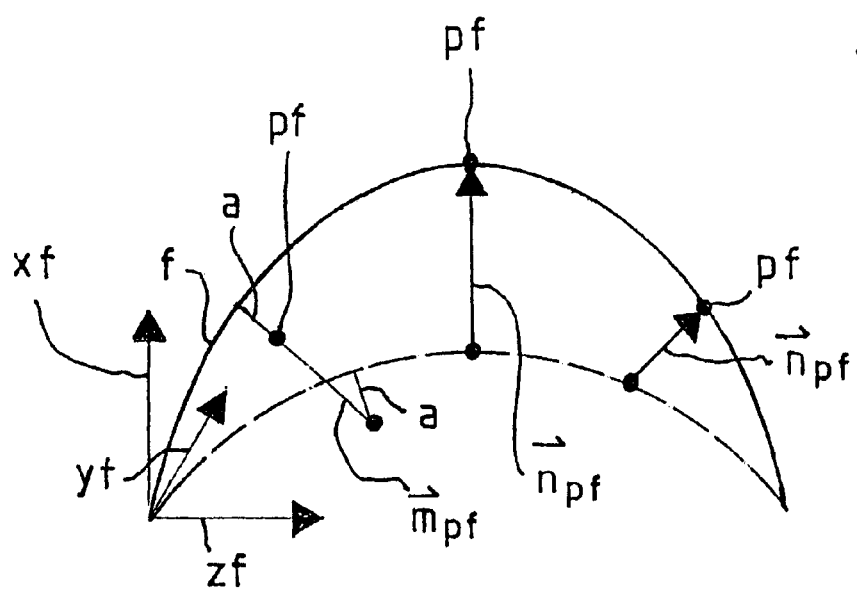
FIG. 5 is a free-form surface f, in section, whose form has been changed.

In FIG. 5, a free-form surface f is shown in section as exemplary of a geometric element. The solid line here describes the changed geometry and the broken line defines the previous contour. In order to achieve, for such a change of the geometric element, that the points pf, which are to be scanned, are adapted in correspondence to the dimensions of the changed geometric element, the points pf, which are to be scanned, are displaced relative to the geometric element coordinate system (xf, yf, zf) of the free-form area f so that the perpendicular spacing a to the free-form surface remains constant. For this purpose, the perpendicular spacing a to the original free-form area is determined in that a perpendicular is dropped to the free-form area starting from the point pf which is to be scanned and then the spacing a between the point pf which is to be scanned and the intersect point of the perpendicular with the free-form area is computed. For points, which lie on the geometric element, this step can of course be dropped because the perpendicular spacing is thereby precisely zero.

In a next step, a normal vector $\vec{n}pf$ is generated from the original point to the changed free-form area f, that is, a perpendicular is dropped to the changed free-form area f and the point is displaced along this normal vector until it again has the distance a.

The described procedure can, in principle, be applied for all geometric elements wherein a change of the dimensions of the geometric element has the consequence that the points, which are to be scanned, no longer are located on the area and/or the line of the geometric element. The corresponding geometric elements would be: the curve, the free-form area, the circle, the ellipse, the cylinder, the torus, the paraboloid, the cone and the sphere. The fact, however, that the points are always displaced in the perpendicular direction toward the changed geometric element can however have the consequence that the point distribution of the points to be scanned on the particular geometric element changes unwontedly. For example, with a cone, wherein the elevation or the circle, which defines the cone, is changed in radius, the slope of the surface line would be changed and the correspondingly displaced point, which is to be scanned, lies on the changed geometric element at another elevation than the original point which is to be scanned.

For geometric elements, which are precisely rotationally symmetrical with respect to an axis, one therefore selects the displacement direction of the points, which are to be scanned, radially to the relevant axis of symmetry. Here, radial is intended to mean the direction of that line along which the spacing between point and symmetry axis is minimal. Such geometric elements can, for example, be the circle, the cylinder, the paraboloid, the cone as well as the torus. This procedure has the special advantages mentioned hereinafter. First, starting from the point of the original geometric element which is to be scanned, no perpendicular has to be dropped to the changed geometric element so that the computing time is saved. Furthermore, it can be ensured hereby that especially for the elements cylinder, paraboloid and cone, the points, which are to be scanned, always remain at one and the same elevation on the geometric element.

Figure 6:
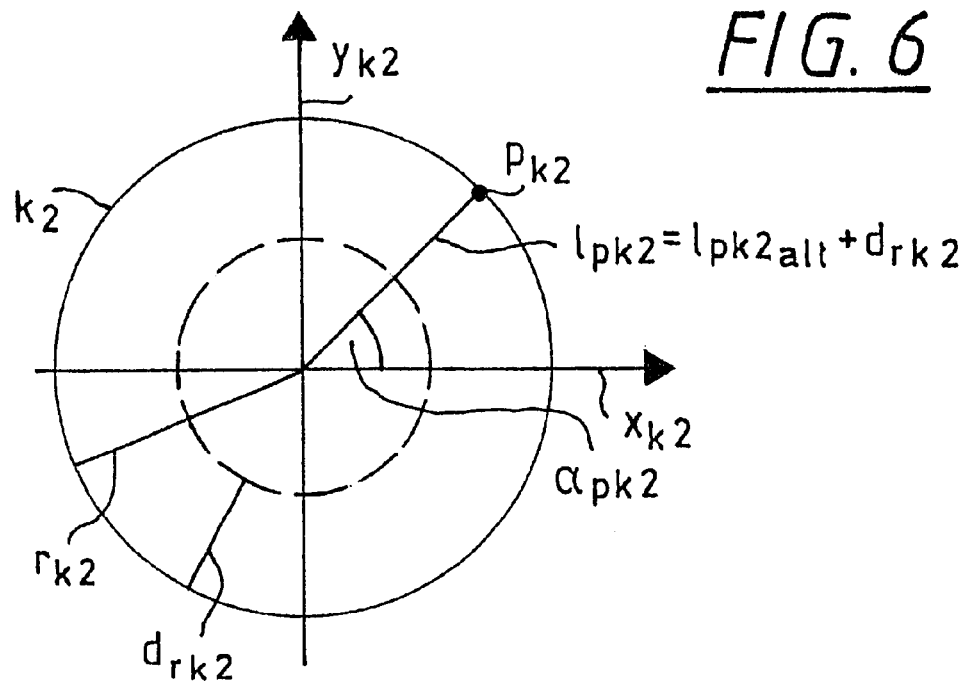
FIG. 6 is a circle (k2) whose radius has been changed.

How the points of the circle k2 from the measurement example in accordance with FIGS. 3 and 4 are, with a change of the radius of the circle k2, adapted to the changed dimensions of the circle k2 will now be presented in connection with FIG. 6. As shown in FIG. 6, the circle shown by the broken line shows the dimensions of the original circle k2. The point pk2, which is to be scanned, had been located initially directly on the circle line of the circle k2 and is now moved away in a radial direction from the symmetrical axis and by the amount of the radial change drk2. The symmetrical axis, as described above, is identical with the Z axis of the corresponding geometric element coordinate system (xk2, yk2, zk2). In this way, the perpendicular spacing of the point pk2 from the geometric element k2 is zero as before.

A third variation wherein the geometric element circle k2 has to be rotated for a change of the workpiece to be measured was not shown in the embodiment of FIGS. 3 and 4. However, as described above, an adaptation of the points, which are to be scanned on the geometric element, to a rotated geometric element is very simple in that the orientation of the geometric element coordinate system is correspondingly adapted, that is, the vectors ($\vec{n}k2$, $\vec{t}k2$) and thereby simultaneously the geometric element coordinate system (xk2, yk2, zk2) is correspondingly rotated. The points, which are to be scanned on the geometric element, are in a fixed spatial relationship to the geometric element coordinate system. For this reason, these points are of course automatically rotated with the rotation of the geometric coordinate system.

A coordinate measuring apparatus is presented having a probe (11), which is movable in the coordinate directions (x, y, z) for scanning a workpiece (12), a mechanism (10) having drives via which this probe can be moved and a control unit (15, 16) for controlling the mechanism. In this apparatus, for defining the points (pk2), which are to be scanned on the workpiece, inter alia, parameters are stored of geometric elements (k1, k2, e1, e2) and parameters of the points (pk1, pk2, pe1, pe2) which are to be scanned on the corresponding geometric elements. In order to make changing the measuring sequence of such coordinate measuring apparatus easier, the parameters of the points (pk2), which are to be scanned on the corresponding geometric elements, are stored referred to a coordinate measuring system (xk2, yk2, zk2) inherent to the particular geometric element (k2).

What is claimed is:

1. A coordinate measuring apparatus defining coordinate directions and comprising:

a probe movable in said coordinate directions for scanning a workpiece at points (pk2) thereof;

a mechanism having drives for moving said probe in said coordinate directions;

a control unit for controlling said mechanism;

said control unit including a memory for storing parameters of geometric elements of said workpiece, which include point parameters of points on said geometric elements, to define said points (pk2); and, said memory storing said point parameters referred to a coordinate measuring system (xk2, yk2, zk2) inherent to the relevant geometric element (k2) of said geometric elements of said workpiece.

2. The coordinate measuring apparatus of claim 1, wherein, in the memory of the control unit, additional parameters, which correspond to each geometric element (k2), are stored as to the offset ($\vec{v}$ k2) and/or the orientation ($\vec{n}$ k2) of the geometric element coordinate system relative to a reference coordinate system (xw, yw, zw) in common with several geometric elements.

3. The coordinate measuring apparatus of claim 2, wherein the parameters in the memory can be changed in the control unit and with a change of the position and/or of the orientation of the geometric element, the parameters of the offset and/or of the orientation of the geometric element coordinate system are changed relative to the reference coordinate system.

4. A coordinate measuring apparatus defining coordinate directions and comprising:

a probe movable in said coordinate directions for scanning a workpiece at points (pk2) thereof;

a mechanism having drives for moving said probe in said coordinate directions;

a control unit for controlling said mechanism;

said control unit including a memory for storing parameters of geometric elements, which include point parameters of points on the geometric elements, to define said points (pk2); and, said memory storing point parameters referred to a coordinate measuring system (xk2, yk2, zk2) inherent to the relevant geometric element (k2);

wherein the parameters in the memory can be changed in the control unit and, for a change of the dimensions of the geometric element, the point parameters are automatically adapted to the changed dimensions in such a manner that the perpendicular spacing (a) of a point (pk2), which is to be scanned on the geometric element, to the geometric element remains constant.

5. The coordinate measuring apparatus of claim 4, wherein in the control unit, geometric elements are stored which are precisely rotationally symmetric referred to an axis; the points, which are to be scanned, are adapted to a change of the dimension of the geometric element in such a manner to the changed geometric element that they are, referred to the axis of symmetry, displaced in the radial direction until the perpendicular spacing (a) is reached.

6. The coordinate measuring apparatus of claim 4, wherein, in the memory of the control unit, additional parameters, which correspond to each geometric element (k2), are stored as to the offset ($\vec{v}$ k2) and/or the orientation ($\vec{n}$ k2) of the geometric element coordinate system relative to a reference coordinate system (xw, yw, zw) in common with several geometric elements.

7. The coordinate measuring apparatus of claim 6, wherein the parameters in the memory can be changed in the control unit and with a change of the position and/or of the orientation of the geometric element, the parameters of the offset and/or of the orientation of the geometric element coordinate system are changed relative to the reference coordinate system.

8. A method for controlling a coordinate measuring apparatus including a probe movable in the coordinate directions (x, y, z) for scanning a workpiece having points (pk1, pk2, pe1, pe2) to be scanned, the method comprising the steps of:

for defining said points (pk1, pk2, pe1, pe2), storing parameters of geometric elements of said workpiece including point parameters of said points to be scanned on the corresponding ones of said geometric elements; and, storing said point parameters referred to a coordinate system (xk2, yk2, zk2) inherent to the relevant geometric element (k2) of said geometric elements of said workpiece.

9. The method of claim 8, wherein additionally parameters, which are assigned to each geometric element (k2), are stored as to the offset ($\vec{v}$ k2) and/or the orientation ($\vec{n}$ k2) of the geometric element coordinate system relative to a reference coordinate system (xw, yw, zw) which is common to several geometric elements.

10. The method of claim 9, wherein, for a change of position and/or of the orientation of the geometric element, the parameters of the offset and/or the orientation of the geometric element coordinate system are changed relative to the reference coordinate system.

11. A method for controlling a coordinate measuring apparatus including a probe movable in the coordinate directions (x, y, z) for scanning a workpiece having points (pk1, pk2, pe1, pe2) to be scanned, the method comprising the steps of:

for defining said points (pk1, pk2, pe1, pe2), storing parameters of the geometric elements including point parameters of points to be scanned on the corresponding geometric elements; and, storing said point parameters referred to a coordinate system (xk2, yk2, zk2) inherent to the relevant geometric element (k2);

wherein, when changing the dimensions of the geometric element, the point parameters are automatically adapted to the changed dimensions which are to be scanned in such a manner that the perpendicular spacing (a) of a point (pk2), which is to be scanned on the geometric element, to the geometric element remains constant.

12. The method of claim 11, wherein geometric elements are stored as geometric elements, which are rotationally symmetrical precisely with respect to an axis, and wherein, for an automatic adaptation to the changed dimensions of the geometric element, the points are displaced radially referred to the symmetrical axis until the above perpendicular spacing (a) of the point is reached, which point is to be scanned on the geometric element.

13. The method of claim 11, wherein additionally parameters, which are assigned to each geometric element (k2), are stored as to the offset ($\vec{v}$ k2) and/or the orientation ($\vec{n}$ k2) of the geometric element coordinate system relative to a reference coordinate system (xw, yw, zw) which is common to several geometric elements.

14. The method of claim 13, wherein, for a change of position and/or of the orientation of the geometric element, the parameters of the offset and/or the orientation of the geometric element coordinate system are changed relative to the reference coordinate system.

* * * * *